United States Patent [19]
Brodsky

[11] Patent Number: 5,809,471
[45] Date of Patent: Sep. 15, 1998

[54] RETRIEVAL OF ADDITIONAL INFORMATION NOT FOUND IN INTERACTIVE TV OR TELEPHONY SIGNAL BY APPLICATION USING DYNAMICALLY EXTRACTED VOCABULARY

[75] Inventor: Marc Herbert Brodsky, Washington, D.C.

[73] Assignee: IBM Corporation, Armonk, N.Y.

[21] Appl. No.: 612,210

[22] Filed: Mar. 7, 1996

[51] Int. Cl.⁶ .......................... G06F 17/21; H04N 7/173; H04M 11/00
[52] U.S. Cl. .............. 704/275; 704/10; 348/13; 348/460; 348/468; 379/93.25
[58] Field of Search ................ 395/2.84; 348/13, 348/460, 468; 704/10, 275; 379/93.25

[56] References Cited

U.S. PATENT DOCUMENTS

| | | | |
|---|---|---|---|
| 4,305,131 | 12/1981 | Best | 345/327 |
| 4,333,152 | 6/1982 | Best | 345/327 |
| 4,569,026 | 2/1986 | Best | 345/327 |
| 4,597,077 | 6/1986 | Nelson et al. | 370/352 |
| 4,695,953 | 9/1987 | Blair et al. | 463/3 |
| 4,709,418 | 11/1987 | Fox et al. | 359/118 |
| 4,711,543 | 12/1987 | Blair et al. | 352/87 |
| 5,179,627 | 1/1993 | Sweet et al. | 704/200 |
| 5,247,347 | 9/1993 | Litteral et al. | 348/7 |
| 5,335,276 | 8/1994 | Thompson et al. | 380/21 |
| 5,384,892 | 1/1995 | Strong | 704/243 |
| 5,438,370 | 8/1995 | Primiano et al. | |
| 5,585,858 | 12/1996 | Harper et al. | 348/485 |
| 5,617,565 | 4/1997 | Augenbraun et al. | 707/4 |

FOREIGN PATENT DOCUMENTS

| | | | |
|---|---|---|---|
| 0651571 A2 | 5/1995 | European Pat. Off. | |
| WO94/14282 | 6/1994 | WIPO | |

OTHER PUBLICATIONS

"Speech Recognition Methods for Controlling Cable Television," IBM Technical Disclosure Bulletin, vol. 38. No. 8 (Aug. 1995).

Primary Examiner—David R. Hudspeth
Assistant Examiner—Tálivaldis Ivars Šmits
Attorney, Agent, or Firm—Anne Vachon Dougherty; Daniel P. Morris

[57] ABSTRACT

A method and apparatus is provided to enable a user watching and/or listening to a program to retrieve supplemental information or supplemental entertainment pertaining to an item just seen or words just heard. The apparatus includes a recognition system which recognizes the user's request and causes its satisfaction to be provided. A dynamically changing dictionary is created from items or keywords extracted from the most recently received program portion. The items or keywords may be contained in closed caption text in a TV signal. Particular items or keywords may be assigned a high priority so that they are maintained in the dictionary for a long duration. The user's request is matched against this continually changing dictionary. Upon recognition of the request, a search is initiated to access, import and deliver to the user the information required to satisfy the request. The information may be presented to the user separately or in coincidence with the normal program using picture in picture or split screen. Alternate embodiments enable preprocessing to obtain and store expanded information for such items and keywords deemed to be of high priority. This speeds up the satisfaction of the user's request for these items or keywords.

37 Claims, 1 Drawing Sheet

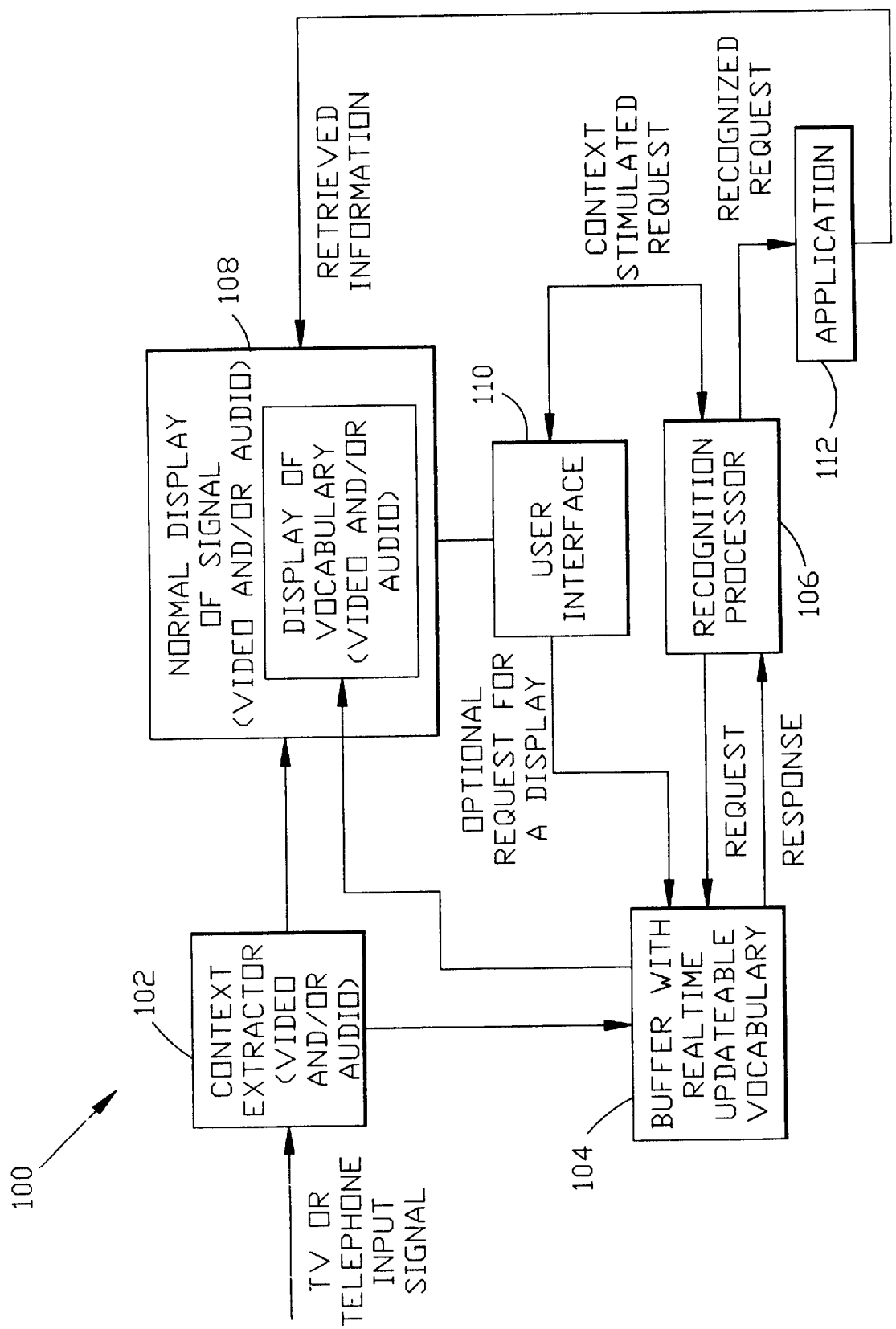

RETRIEVAL OF ADDITIONAL INFORMATION NOT FOUND IN INTERACTIVE TV OR TELEPHONY SIGNAL BY APPLICATION USING DYNAMICALLY EXTRACTED VOCABULARY

FIELD OF THE INVENTION

The present invention is directed to the field of interactive multimedia. It is particularly directed to interactive database retrieval, storage, and display.

BACKGROUND OF THE INVENTION

It is a constant endeavor to find ways to provide to a user receiving a video and/or audio transmission more and more supporting information. A developing support process is to provide the user with interactive services. For instance, interactive TV proponents are putting forth a variety of concepts for interactive means for viewers to participate more in a communicating way with material displayed on a TV. This often takes the form of satisfying a user's inquiry based on information displayed and/or heard.

Compact Disk—Interactive (CD-I) and other preprogrammed multimedia materials allow a user/viewer to navigate through a database's contents. It gives the viewer options of making inquiries based on preprogrammed menus. Inquiries may be made using electronic, electro-optic or infra-red direct or remote controllers for selection from a displayed menu. Some applications employ voice recognition techniques. These allow a user to make a voice inquiry or to make a voice selection from a simple menu, or from a more extensive set of options such as a table of contents, an index or even a complete book. Commercial examples exist for text and bibliographic database searches. Examples of this type of database include Dow Jones, Nexis/Lexis, and Dialog.

Implementation of voice or other recognition selection techniques for such systems, generally requires that the recognition system be capable of matching the user input against a huge dictionary. The dictionary may have to include virtually all words in the language, even proper nouns, acronyms and jargon. Such recognition processing is hardware and software intensive and is expensive to implement in both dollars and processing time. Even then, the results are inherently subject to long delays, ambiguity and error because of the large target dictionary that has to be searched.

SUMMARY OF THE INVENTION

An object of the present invention is to provide a method and apparatus to enable a user watching and/or listening to a program to retrieve supplemental information pertaining to an item just seen or words just heard. The apparatus includes a recognition system which recognizes the user's request and causes its satisfaction to be provided. A dynamically changing dictionary is created from items or keywords extracted from the most recently received program portion. The user's request is matched against this continually changing dictionary. Upon recognition of the request, a search is initiated to access, import and deliver to the user the information required to satisfy the request.

It is also an object of the present invention to provide a system which receives an input signal from a program and displays the program on a program display medium to a user. The input signal has a plurality of information components for which an application can provide expanded information. The system includes a context extractor for extracting each of the plurality of information components from the input signal, and a buffer for receiving and storing each of the extracted information components from the context extractor. It also has a user interface for the user to make a request to receive the expanded information regarding an information component, and a recognition processor for receiving the request and recognizing a match between the request and the extracted information components. It forwards the match to the application which provides the expanded information for display on the displaying medium.

In one embodiment, the system further comprises an application medium to provide the expanded information for at least one of the information components. In one embodiment, the recognition processor performs preprocessing on at least one of the extracted information components. It is desirable for the buffer to have a storage capacity, which upon becoming filled receives additional information components by overwriting the oldest information components stored in the buffer. In one embodiment the information components are contained in closed caption text with the input signal, and the extractor includes a means to separate the closed caption text from the input signal.

Still another object of the present invention is a real time recognition system comprising: means for extraction of a target vocabulary from a current stream of information; a buffer to store the target vocabulary; means for a user who views the current stream of information to make a request for additional information about an entry in the target vocabulary; and a recognition processor that converts the user's request into a topic matched against the target vocabulary. It is desirable for the current stream to have a format for viewing, and for the matched topic to be recognizable by an application. The system includes means for relaying the matched topic to the application, means for retrieving the additional information from the application, and means for forwarding an amount of the additional information back to the user via a retrieved signal stream in the format for viewing.

Another object of the present invention is a dynamic dictionary comprising an input information stream having a plurality of recognizable information components, a recognizer for receiving the information stream and recognizing and selecting the information components, and a buffer for storing the selected information components. It is desirable for the dictionary to include an index of the selected information components, store them sorted in an ascending alpha numeric sequence, and to make them available to the user from a menu display means for displaying the index.

Another object of the present invention is a recognition method for receiving an input signal from a program and displaying the program on a program display medium to a user. The input signal has a plurality of information components for which an application can provide expanded information The method comprises the steps of: extracting each of the information components from the input signal; storing in a buffer each of the extracted information components; responding to a request from the user to receive expanded information regarding at least one of the information components; matching the request to the extracted information components; and forwarding the match to the application. The application then provides the expanded information for display on the displaying medium. It is desirable for the method to include the step of providing an application medium to provide the expanded information for at least one of the information components. It is also desirable to include a step of preprocessing at least one of the extracted information components. It is also desirable for the buffer to have a storage capacity, which upon becoming filled with information components stores additionally received information components by first overwriting the oldest stored information components.

Still another object of the present invention is a method for forming a real time recognition system for which an application can provide expanded information for a plurality of topics. The method comprises the steps of extracting a target vocabulary from a current stream of information, storing the target vocabulary in a buffer as the vocabulary is updated, responding to a user's request for additional information about an entry in the vocabulary, and matching the request against the buffered vocabulary. It is desirable to include a step of relaying the matched topic to an application that retrieves the request for additional information and forwards an amount of retrieved additional information back to the user via a retrieved signal stream compatible with the current stream of information. The retrieved information is generally put into the same format as the current stream for the user's viewing on the display. It is also desirable to include a step of displaying at least a part of the buffer contents so that the user can choose a valid request.

Another object of the present invention is to provide a method for forming a dynamic dictionary. The method includes the steps of providing an input information stream having a plurality of recognizable information components, recognizing and selecting the information components, and storing the selected information components in a buffer. It is desirable to include a step of indexing the selected information components, a step of sorting the index in an alpha numeric sequence, and/or a step of displaying the selected information in a menu. It is also desirable to include a step of displaying the additional information together with the current stream using picture in picture, split screen, video text and/or selective picture. It is further desirable to include a step of assigning a priority to each of the extracted information components and to store them for a particular duration. The particular duration may be dependent upon the assigned priority of the information component.

BRIEF DESCRIPTION OF THE DRAWING

These and other objects, features, and advantages of the present invention will become apparent upon further consideration of the following detailed description of the invention when read in conjunction with the illustration of a block diagram of an embodiment of the present invention.

DETAILED DESCRIPTION OF THE INVENTION

This invention provides a method and apparatus to enable a user watching and/or listening to a program to retrieve supplemental information or supplemental entertainment pertaining to an item just seen, or more generally pertaining to a word or group of words just heard. The program may be received via any transmission means including radio, TV and telephone. The apparatus includes a recognition system which can recognize the user's request and cause its satisfaction to be provided. This is accomplished by creating a dynamically changing dictionary of items or keywords extracted from the most recently received program portion. The user's request is matched against this continually changing dictionary. Upon recognition of the request, a search is initiated to access, import and deliver to the user the information required to satisfy the request. In this way, a relatively small, continuously updated dictionary is created in real time. Its entries need only include the items and/or keywords extracted from the most recently received portion of the program.

The present invention recognizes that in terms of interactivity, a viewer is most likely to request information regarding items and/or words recently presented. Therefore, the invention creates a dictionary of items, key items, words or keywords recently presented to the user for the program in process. These form the totality of entries in the target dictionary of the recognition system. This reduces the recognition system's recognition requisite to that of recognizing only a limited vocabulary. This is much less complicated and more simple to implement in terms of storage capacity, software and hardware requirements, processing time, cost, power, accuracy and many other success criteria. It also makes possible the advantageous utilizations described herein.

As used in this application, the reference to a program 'item' or 'word' refers to a possible target for request recognition. This includes, but is not limited to program 'items' and/or qqq'words' such as spoken words, text, visual or audio information. These are generally given or converted to a text type format. A reference to a 'dictionary' or stored 'vocabulary' refers to any array of coded information against which a recognition match can be sought. Thus, a program 'item' or 'word' is a candidate 'dictionary' entry and is part of the 'vocabulary' of that 'dictionary'. An 'item' or 'word' is said to be 'recently presented' if it is within the group of latest 'items' or 'words' received that fit within a storage buffer provided for that purpose. This may be dependent upon the storage buffer capacity and/or upon the performance capacity of the recognition system. Capacity may be a real physical limit, a user-defined limit, or an application-defined performance limit. As new items and/or words are received older non-repeated items are overwritten.

The illustration shows a block diagram of an embodiment of the present invention. It shows a context extractor 102, buffer vocabulary 104, recognition processor 106, user interface 110, and a signal display 108. The context extractor 102 has a data processor to extract words and/or items from an audio, video or telephony signal. The extractor 102 samples the incoming signal and identifies 'words' and transmit those 'words' to the buffer for storage in the dictionary. The selection criteria may include matching all acceptable 'words' against an application-supplied listing of available topics. The signal is also passed undisturbed on to its normal display 108, say a TV set, radio or a telephone.

The buffer vocabulary 104 is updatable in real time. It is a means to store the recently extracted items and/or 'words' that define the vocabulary for potential recognition requests. The buffer 104 receives 'words' from the context extractor 102 and operates with parameters that set how many 'words' to store or how long a period of time to store them. As the buffer fills, older or lower priority words are dropped and new entries replace them so that the buffer always contains the latest most relevant information for the user. The buffer is able to respond to a request from the user to display its contents, or any part thereof. The buffer also responds to a request from the recognition processor for the current vocabulary.

The recognition processor 106 is a means to receive requests from the user and is capable of matching 'words' spoken or otherwise transmitted. The recognition processor can be similar to the 'IBM Voice Type Dictation Solution' system. It recognizes the user's request by matching the request 'words' against the vocabulary stored in the buffer 104. When a match is made, the recognition processor 106 interprets the meaning of the request and relays the request to the application 112. As an option, means are provided to anticipate requests for a match by relaying 'words' already in the buffer even before a request is made. When this is employed, the application can preprocess searches for those 'words' and make the search results ready for delivery to the user. In the event that the user actually makes a request for a preprocessed item the system satisfies the request more quickly.

The user interface 110 is a means for the user receiving the radio, TV or telephone signals to make requests by voice or other input request means for more video or audio information about a topic recently seen or heard. The user interface gives a viewer or listener the ability to directly or remotely make requests to an application and to view the response. Options are provided for the user to view or hear the 'words' that are valid requests. Options may be provided for other forms of requests, say by button selection from a visual or audio menu of valid requests.

The signal display 108 is a means to present audio, video and/or telephone signals to a viewer or listener. The signal display 108 may be a normal radio, TV or telephone that a user is watching or listening to. It presents whatever the user normally expects and in addition shows the response to context-stimulated requests. The display is also used to present the menu of valid requests when commanded by the user. For a video display situation, the request satisfaction can use selective video to replace or be shown together with the normal video. This can be accomplished using known techniques including picture in picture and split screen. A useful option is to provide a means for the user to display all or part of the buffer contents to enable the user to choose a valid request. This can be formed in the fashion of a menu of the dictionary entries.

In one embodiment of this invention, the apparatus employs closed caption text as input to the storage buffer. In the United States, closed caption text is transmitted in line 21 of the vertical blanking interval in NTSC signals. It is desirable that the apparatus and method of this invention be able to capture and employ other video data services for searching, locating and importing information to satisfy a user's request. Examples of such services are teletext and the Electronics Industry Associations standard data services for NTSC, EIA-608 Standard: Line 21 Data Services for NTSC, 1994.

It may be desirable to allow the setting of priorities for all 'items' and/or 'words'. Priorities may be set so that certain application relevant 'items' or 'words' are kept a longer than ordinary duration, or even for the whole length of the program being watched. This could depend upon the type of program being watched, news, sports, music, movie etc. A high priority may be assigned to words identifying the program itself. Some of this information may be captured directly from the visual or audio part of the signal. It may also be captured from imbedded parts of the signal, such as closed caption text transmitted in video vertical blanking intervals. Any stored item and/or word only occurs once in the dictionary. In some applications, the number of occurrences of an item and/or word in the program may be continuously updated and logged. This can serve as a basis for determining the priority of that item or word.

It is also desirable to provide means to do preprocessing on items and words stored. The preprocessor may perform searches to seek, identify, prepare for retrieval or even retrieve information from one or more particular databases regarding items or words stored in the dictionary. This may be performed continuously as new items and/or words are received and added to the buffered storage. Preprocessing of key words representing potential user requests, decreases system response time when such a request is subsequently made. Preprocessing is desirably performed in conjunction with the priorities of particular items or words. It may only search for items or words assigned with at least a moderately high priority level, and actually retrieve information only for items or words assigned with a higher priority level than that of the moderately high priority level.

There are many possible embodiments for the present invention. The following describes several of these for a program user seeing and/or hearing something that is of further interest. In one scenario, a user is watching a television news program, the viewer hears the newscaster mention some country, for example, 'France'. The user may even see a map of that country shown on the screen. The map shown is not informative enough for the viewer. Then the newscaster moves on to another topic. With this invention, the viewer calls up a menu of recently stored key words and notes that the word 'France' and/or the 'map of France' was indeed stored in the dictionary. Then the viewer inputs a request for 'France'. The input may be via voice, or via a direct or remote selection from a displayed dictionary menu. The recognition system matches that word against the words in its dictionary, and recognizes that the viewer wants some information about France. It issues a request to an application database for information about France. The application may be on a local or remote CD-ROM or database which includes an encyclopedia. The application retrieves the encyclopedia's data entry on France. Depending on the sophistication of the application, the retrieved data may be displayed in its entirety, the user may be offered topic entry segments for display, or the user may be provided with a listing of information headings for the selected topic, namely France. The retrieved information may be displayed as an overlay on the TV broadcast via a picture-in-picture, split screen, text at the bottom or by other means. The user may even be offered a display of the map of France. The viewer ordinarily has the ability to zoom in or out and to put the news story location in perspective.

In another embodiment, the apparatus provides the needs for the following scenario. While watching a movie a viewer hears an actor refer to a character in the plot. A service provided by the movie program producer, broadcaster or a dial-up service provider, gives program relevant information upon a user's request. The entire index of provided information may be extremely large, and take up more memory capacity than is available for use as a menu display to a general user. It may include items such as program statistics, its characters and/or the cast playing the characters. The present invention reduces the amount of index information required in the menu displayed to the user. The displayed menu is limited to index information regarding only items recently presented to the viewer. This limited amount of index information is indeed within the memory capacity of the general user's equipment. The index information is dynamic, and slowly changing to contain items and words from the most recently presented part of the movie. The viewer chooses the specific desired topic from the displayed menu. For example, if the user inputs the name of a character for whom additional information is desired, the name is compared to the menu dictionary. The recognition processor then compares the name against the valid names in the displayed menu. Upon making the match, the processor transmits the match to the database application. The desired information is retrieved and displayed as a subtitle type text, while the viewer is still watching the movie. A second portion of memory information is relatively static. It contains some menu entries that are normally maintained for the duration of the program. This includes the name of the movie and other information that may be used to pin point program relevant database segments.

Another aspect of the present invention is a dynamic dictionary comprising an input information stream having a plurality of recognizable information components, a recognizer for receiving the information stream and recognizing and selecting the information components and a buffer for storing the selected information components. It is desirable for the dictionary to include an index of the selected information components. The selected information components may be stored in a sorted arrangement, and be made available to the user from a menu display means for displaying the index. The sort may be based upon the information component's priority, the sequence of being received, or by descending or ascending alpha numeric sequence.

Although the description is made for a particular block diagram and arrangement the intent and concept of the present invention are suitable and applicable to other arrangements. It will be clear to those skilled in the art that other modifications to the disclosed embodiments can be effected without departing from the spirit and scope of the invention.

What is claimed is:

1. A system receiving an input signal from a program and displaying said program on a program display medium to a user, said input signal having a plurality of information components for which an application can provide expanded information not found provided in said input signal, said system comprising:
   a context extractor for extracting each of said plurality of information components from said input signal;
   a buffer for receiving and storing each of said plurality of information components extracted by said context extractor for a predetermined time;
   a user interface for said user to make a request to receive said expanded information regarding at least one of said plurality of information components; and
   a recognition processor for receiving said request, for recognizing a match between said request and said information components extracted by said context extractor, and for forwarding said match to said application, whereby said application retrieves said expanded information and provides said expanded information for display on said displaying medium.

2. A system as in claim 1 further comprising an application medium to provide said expanded information for at least one of said plurality of information components.

3. A system as in claim 1 wherein said recognition processor performs preprocessing on at least one of said plurality of information components extracted.

4. A system as in claim 1 wherein said request is a voice request made by said user.

5. A system as in claim 1 wherein said buffer has a storage capacity, and where upon said received information components filling said storage capacity so that additionally received said information components are stored by overwriting the oldest stored said information components.

6. A system as in claim 1 wherein said plurality of information components extracted from said input signal form a dynamic dictionary.

7. A system as in claim 1 wherein said input signal includes closed caption text, and wherein said extractor includes a means to separate said closed caption text from said input signal, and wherein at least one of said plurality of information components is included in said closed caption text.

8. A system as in claim 7 wherein said input signal is an NTSC type TV signal and where said closed caption text is on NTSC line 21.

9. A system as in claim 1 further comprising a means for assigning a priority to each of said information components extracted by said context extractor.

10. A system as in claim 9 wherein each of said information components extracted is stored in said buffer for at least a predetermined duration and wherein said duration is dependent upon said priority assigned to each of said extracted information components.

11. A system as in claim 1 wherein said expanded information is provided together with said program display using at least one means selected from the group consisting of picture in picture, split screen, video text and selective picture.

12. A real time recognition system comprising:
   means for extraction of a target vocabulary from a current stream of information;
   a buffer to store said target vocabulary as said target vocabulary is updated;
   means for a user who views said current stream of information to make a request for additional information about an entry in said target vocabulary extracted from said current stream; and
   a recognition processor that converts said user's request into a matched topic against said target vocabulary.

13. The system of claim 12 wherein said current stream has a format for viewing, and wherein said matched topic is recognizable by an application, said system further comprising:
   means for relaying said matched topic to said application;
   means for retrieving said additional information from said application; and
   means for forwarding an amount of said additional information back to said user via a retrieved signal stream in said format for viewing.

14. The system of claim 12 further comprising means for said user to display at least a part of the buffer contents so that said user can choose a valid request.

15. A dynamic dictionary comprising:
   an input information stream having a primary stream and a secondary stream, said secondary stream comprising a plurality of recognizable information components;
   a recognizer for receiving said information stream, recognizing and selecting said plurality of recognizable information components; and
   a buffer for storing said plurality of recognizable information components selected by said recognizer for a predetermined time.

16. A dictionary as in claim 15 further comprising an index of said plurality of recognizable information components selected by said recognizer.

17. A dictionary as in claim 16 wherein said index is sorted in an ascending alpha numeric sequence.

18. A dictionary as in claim 16 further comprising a menu display means for displaying said index.

19. A dictionary as in claim 15 wherein said buffer has a capacity, each of said plurality of recognizable information components is stored for at least a predetermined duration, and a plurality of first received information components are being stored for a longer duration than a later received plurality of information components, and where upon said capacity becomes filled with said plurality of recognizable information components, additionally received said plurality of recognizable information components are stored by overwriting said plurality of first received information components before overwriting said later received plurality of information components.

20. A real time user voice recognition system interacting with an application, said application being capable of providing additional information for a plurality of topics, said system comprising:

means for extracting an updated target vocabulary from a current stream of information having a format for viewing;

a buffer for receiving said updated target vocabulary as said updated target vocabulary is extracted and for storing said updated target vocabulary for a predetermined time;

means for said user viewing said current stream of information to make a request for an amount of additional information, not provided in said current stream of information, about at least one entry of said updated target vocabulary recently referred to in said stream of information;

a recognition processor for converting said request into a matched topics against said updated target vocabulary, and for relaying said matched topic to said application;

means for retrieving said amount of additional information from said plurality of topics of said application; and means for sending said amount of additional information to said user via a retrieved signal stream in said format for viewing.

21. A recognition system as in claim 20 further comprised of a database application capable of providing additional information for at least one of said plurality of topics.

22. A recognition system as in claim 20 wherein said recognition processor performs preprocessing for at least one entry of said updated target vocabulary.

23. A recognition method for receiving an input signal form a program and displaying said program on a program display medium to a user, said input signal having a plurality of information components for which an application can provide expanded information not provided in said input signal, said method comprising the steps of:

extracting each of said plurality of information components from said input signal;

storing in a buffer each of said plurality of information components extracted for a predetermined time;

responding to a request from said user to receive said expanded information regarding at least one of said plurality of information components extracted;

matching said request to said information components extracted; and forwarding said match to said application whereupon said application provides said expanded information for display on said displaying medium.

24. A method as in claim 23 further comprising the step of providing an application medium to provide said expanded information for at least one of said each of plurality of information components.

25. A method as in claim 23 further comprising a step of preprocessing at least one of said extracted information components.

26. A method as in claim 23 wherein said request is made by and recognized from a voice request by said user.

27. A method as in claim 23 wherein said buffer has a storage capacity, and where upon said received information components fills said storage capacity such that additionally received said information components are stored by overwriting the oldest stored said information components.

28. A method as in claim 23 further comprising a step of forming a dynamic dictionary of said information components of said program.

29. A method as in claim 23 further comprising the step of assigning a priority to each of said extracted information components and wherein each of said extracted information components is stored for a particular duration and wherein said particular duration is dependent upon said assigned priority.

30. A method for forming a real time recognition system that comprises the steps of:

extracting a target vocabulary from a current stream of information;

receiving said target vocabulary in a buffer as said target vocabulary is updated and storing said target vocabulary in said buffer for a predetermined time;

responding to a current user's request for additional information not provided in said stream of information about an entry in said target vocabulary; and matching said user's request against said buffered vocabulary.

31. A method of claim 30 wherein said current stream is in a format for viewing, said method further comprising the steps of relaying said matched topic to an application that retrieves said request for said additional information, and forwarding an amount of retrieved said additional information back to said user via a retrieved signal stream in said format for viewing.

32. A method as in claim 30 further comprising the step of displaying said additional information together with said current stream using at least one means selected from the group consisting of picture in picture, split screen, video text and selective picture.

33. A method of claim 30 further comprising the step of displaying at least a part of said buffer contents so that said user can choose a valid request.

34. A method as in claim 33 further comprising the step of displaying said selected information in a menu.

35. A method for forming a dynamic dictionary comprising the steps of:

providing an input information stream having a first stream and a second stream, said second stream comprising a plurality of recognizable information components;

recognizing and selecting said information components; and storing said selected information components in a buffer for a predetermined time.

36. A method as in claim 35 further comprising the step of indexing said selected information components.

37. A method as in claim 36 wherein said index is sorted in an ascending alpha numeric sequence.

* * * * *